United States Patent Office 3,193,579
Patented July 6, 1965

---

3,193,579
TEREPHTHALAMIDES AND INTERMEDIATES USEFUL IN PREPARING SAME
Moses Wolf Goldberg, Upper Montclair, N.J., and Sidney Teitel, New York, N.Y., assignors to Hoffmann-La Roche Inc., Nutley, N.J., a corporation of New Jersey
No Drawing. Filed July 1, 1963, Ser. No. 292,164
6 Claims. (Cl. 260—559)

The present invention relates to therapeutic compounds and intermediates therefor and processes of making the same.

More particularly, the present invention relates to compounds having the formula of

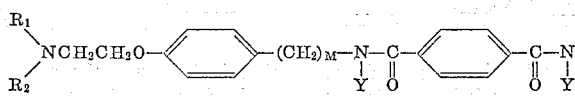

wherein $R_1$ and $R_2$ represent a lower alkyl radical such as methyl; Y represents hydrogen, a

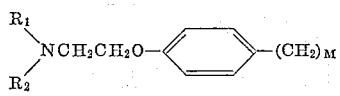

group such as 4-(2-dimethylaminoethoxy)benzyl or lower alkyl; and M is either 0 or 1.

In a preferred embodiment, $R_1$ and $R_2$ are both methyl. In a still more preferred embodiment, $R_1$ and $R_2$ are methyl, Y is hydrogen and M is 1.

The compounds of Formula I may be readily synthesized by reacting a compound having the formula of

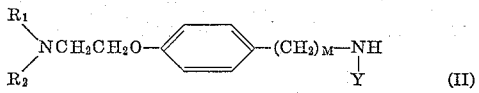

wherein $R_1$, $R_2$, M and Y have the same meanings as ascribed thereto hereinabove with a terephthaloyl halide such as terephthaloyl chloride or terephthaloyl bromide, preferably the former.

This invention is suitably effected in any convenient inert organic solvent such as acetonitrile, acetone, chloroform, toluene or the like. While temperature is not critical, the reaction is preferably effected at a temperature from about 20° C. to about 120° C.

In an alternate embodiment for forming compounds of Formula I above, compounds corresponding to Formula II above are treated with a lower alkyl diester of terephthalic acid such as the diethyl ester of terephthalic acid in the presence of an inert organic solvent, e.g. a lower alkanol such as ethanol, anisole, dimethylformamide or the like. The reaction is favorably effected at a temperature of from about 100° to about 160° C. although the reaction temperature is not critical.

Compounds corresponding to Formula II above wherein Y is a

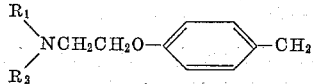

group are novel. Such intermediates may be prepared by two alternate courses of procedure. By one route, a substituted benzaldehyde of the formula

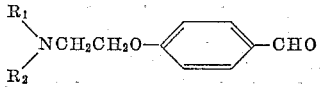

is hydrogenated in the presence of ammonia and a palladium-on-calcium carbonate catalyst, in a suitable inert organic solvent, which may be a lower alkanol such as ethanol. By another route, a substituted benzaldoxime of the formula

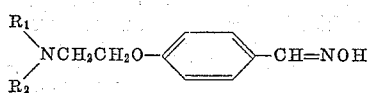

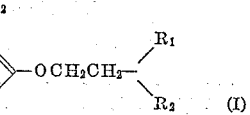

is hydrogenated in the presence of a palladium-on-carbon catalyst in a suitable inert organic solvent which can be a lower alkanol such as methanol.

The compounds of Formula I above and the said novel intermediates of Formula II above wherein Y is a

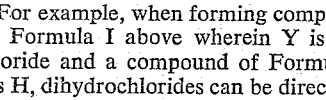

group form acid addition salts with common inorganic or organic acids such as the hydrohalic acids, e.g. hydrochloric, hydrobromic etc., other mineral acids, e.g. nitric, sulfonic, phosphoric etc., arylsulfonic acids, e.g. benzenesulfonic, toluenesulfonic etc., as well as maleic, salicylic, tartaric, citric, ascorbic, mandelic acids and the like. Such acid addition salts are also within the scope of the present invention.

The formation of said acid addition salts may be effected in situ. For example, when forming compounds corresponding to Formula I above wherein Y is H, utilizing a diacid chloride and a compound of Formula II above wherein Y is H, dihydrochlorides can be directly obtained. Alternatively, the basic reaction products can be treated with a sufficient amount of an acid of the type enumerated hereinabove to form the desired salt. For example, compounds corresponding to Formula I above wherein Y is a

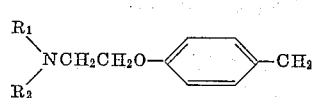

group can be treated with a sufficient amount of HCl to form the tetrahydrochloride.

The compounds of this invention are vasodilators of prolonged activity and of especially good compatibility. They may be used to bring about a lowering of blood pressure and can be used in hypertension.

The compounds of Formula I and their pharmaceutically acceptable acid addition salts can be administered internally, i.e. parenterally or enterally, by incorporating therapeutic dosages in conventional pharmaceutical liquid or solid vehicles to provide elixirs, suspensions, tablets, capsules and the like according to accepted pharmaceutical practice.

The expression "lower alkyl," as utilized hereinabove, is intended to connote both straight and branched chained alkyl groups such as methyl, ethyl, propyl, isobutyl and the like.

An especially valuable compound suitable for the purposes of the present invention, i.e. as a hypotensive agent, is N,N'-bis[4-(2-dimethylaminoethoxy)benzyl]terephthalamide.

The following examples are illustrative but not limitative of the present invention. All temperatures are in degree centigrade.

*Example 1*

To a stirred, refluxing solution of 18.9 g. of 4-(2-dimethylaminoethoxy)aniline in 100 ml. of acetonitrile, there was added, over a 1 hour period, 10.1 g. of terephthaloyl chloride dissolved in 100 ml. of acetonitrile. The mixture was stirred and refluxed for 8 hours and then cooled. The crystalline precipitate was filtered off and recrystallized from a mixture of water-methanol-ether to give 4,4'-bis(2-dimethylaminoethoxy)terephthalanilide dihydrochloride, M.P. 314–316° C.

*Example 2*

To a stirred, refluxing solution of 20.4 g. of 4-(2-dimethylaminoethoxy)benzylamine in 100 ml. of acetonitrile, there was added, over a 1 hour period, 10.1 g. of terephthaloyl chloride dissolved in 100 ml. of acetonitrile. The mixture was stirred and refluxed for 8 hours and then cooled. The crystalline precipitate formed was filtered off and recrystallized from water-ethanol to give N,N' - bis[4 - (2 - dimethylaminoethoxy)benzyl]terephthalamide dihydrochloride, M.P. 279–281° (with decomposition).

*Example 3*

To a solution of 112 g. of 4-(2-dimethylaminoethoxy)benzaldehyde in 250 ml. of 16 percent ammoniacal ethanol was added 4 g. of 10 percent palladium-on-calcium carbonate. The mixture was hydrogenated at 160° and 300 p.s.i. until 110 pounds of hydrogen was taken up. The catalyst was filtered off, the volatiles were distilled off and the residual oil fractionated in high vacuum to obtain di - [4 - (2 - dimethylaminoethoxy)benzyl]amine, B.$_{0.03}$ 215°, $n_D^{25}$ 1.5502.

An aliquot of the amine, when treated with a solution of hydrogen chloride in ethanol, gave the crystalline di - [4 - (2 - dimethylaminoethoxy)benzyl]amine trihydrochloride, melting at 216–263° with decomposition (from methanol-ethanol-ether).

*Example 4*

To a solution of 9 g. of hydroxylamine hydrochloride and 5.2 g. of sodium hydroxide in 50 ml. of water, there was added a solution of 19.3 g. of 4-(2-dimethylaminoethoxy)benzaldehyde in 70 ml. of ethanol. The resulting solution was refluxed for ½ hour, cooled, and the crystals that formed were filtered off and dried to give 4-(2-dimethylaminoethoxy)benzaldoxime, M.P. 90–91°.

9 g. of 10 percent of palladium-on-carbon were added to a solution of 181 g. of 4-(2-dimethylaminoethoxy)benzaldoxime in 200 ml. of methanol. The mixture was hydrogenated at 60° and 500 p.s.i. until 223 pounds of hydrogen was taken up. The catalyst was filtered off, the volatiles distilled off and the residual oil fractionated in high vacuum yielding di-[4-(2-dimethylaminoethoxy)benzyl]amine, B.$_{0.025}$ 213°, $n_D^{25}$ 1.5500.

*Example 5*

To a stirred, refluxing solution of 19.5 g. of di-[4-(2-dimethylaminoethoxy)benzyl]amine in 50 ml. of acetonitrile, there was added, over 1 hour period, 5.1 g. of terephthaloyl chloride dissolved in 50 ml. of acetonitrile. The mixture was stirred and refluxed for 8 hours and then cooled. The volatiles were distilled off. The residual solid was dissolved in methanol and to the resultant solution there was added hydrogen chloride dissolved in ethanol until a pH of 1 was obtained. The volatiles were distilled off and the residue was crystallized from methanol-acetone-ether to yield N,N,N',N'-tetra[4 - (2 - dimethylaminoethoxy)benzyl]terephthalamide tetrahydrochloride monohydrate, melting at 222–224°.

We claim:

1. A compound selected from the group consisting of compounds of the formula

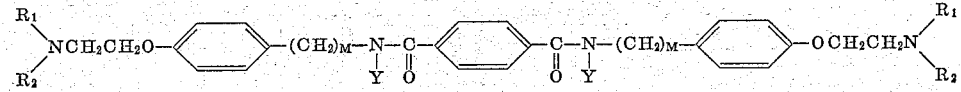

wherein $R_1$ and $R_2$ are each selected from the group consisting of lower alkyl; Y is selected from the group consisting of hydrogen,

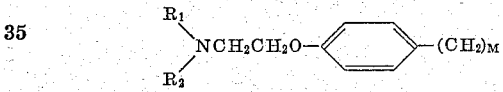

and lower alkyl and M is an integer of 0 to 1. and acid addition salts thereof with pharmaceutically acceptable acids.

2. 4,4'-bis(2-dimethylaminoethoxy)terephthalanilide.
3. N,N' - bis[4 - (2 - dimethylaminoethoxy)benzyl]-terephthalamide.
4. N,N,N',N' - tetra[4 - (2 - dimethylaminoethoxy)-benzyl]terephthalamide.
5. A compound selected from the group consisting of compounds having the formula of

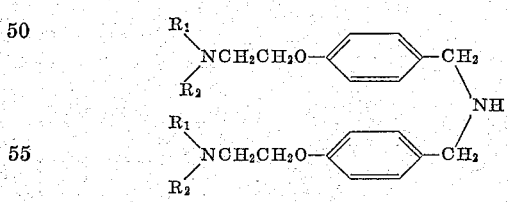

wherein $R_1$ and $R_2$ are selected from the group consisting of lower alkyl, and acid addition salts thereof with pharmaceutically acceptable acids.

6. di-[4-(2-dimethylaminoethoxy)benzyl]amine.

References Cited by the Examiner

UNITED STATES PATENTS 2,879,293   3/59   Goldberg et al. _____ 260—559
3,047,628   7/62   Goldberg et al. _____ 260—570.7

OTHER REFERENCES

Noller: Chemistry of Organic Compounds, second ed., page 232 (1957).

WALTER A. MODANCE, *Primary Examiner.*

NICHOLAS S. RIZZO, *Examiner.*

UNITED STATES PATENT OFFICE
CERTIFICATE OF CORRECTION

Patent No. 3,193,579                                          July 6, 1965

Moses Wolf Goldberg et al.

It is hereby certified that error appears in the above numbered patent requiring correction and that the said Letters Patent should read as corrected below.

Columns 1 and 2, lines 17 to 21, for that portion of formula (I) reading

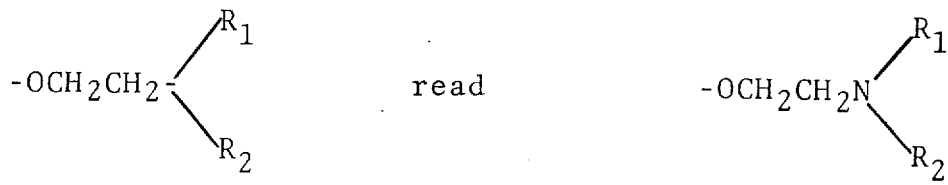

column 1, line 45, for "invention" read -- reaction --; column 2, line 1, after "Such" insert -- novel --; column 3, line 60, for "216-263°" read -- 261-263° --.

Signed and sealed this 22nd day of February 1966.

(SEAL)
Attest:

ERNEST W. SWIDER                             EDWARD J. BRENNER
Attesting Officer                          Commissioner of Patents